United States Patent [19]

Welzel et al.

[11] 4,396,265
[45] Aug. 2, 1983

[54] MONOCULAR REFLEX CAMERA HAVING REFLEX MIRROR STOP ADJUSTMENT

[75] Inventors: Herbert Welzel; Lothar Reschke; Heinz Schulze, all of Dresden, German Democratic Rep.

[73] Assignee: VEB Pentacon Dresden Kamera und Kinowerke, Dresden, German Democratic Rep.

[21] Appl. No.: 340,934

[22] Filed: Jan. 20, 1982

[30] Foreign Application Priority Data

Feb. 10, 1981 [DD] German Democratic Rep. ... 227518

[51] Int. Cl.³ .................................... G03B 19/12
[52] U.S. Cl. .................................... 354/152
[58] Field of Search .................... 354/54–56, 354/152–158, 201

[56] References Cited

U.S. PATENT DOCUMENTS 4,103,311 7/1978 Horigome .................... 354/152

FOREIGN PATENT DOCUMENTS 146348 2/1981 German Democratic Rep. .................... 354/152

Primary Examiner—John Gonzales
Attorney, Agent, or Firm—Dowell & Dowell

[57] ABSTRACT

A monocular reflex camera having a device for adjusting the viewfinding position of a viewfinder mirror of which the pivot spindle is arranged in crankshaft manner in the camera housing, the viewfinder mirror being urged by a spring in the viewfinding position against first and second stop devices. Each stop device consists of a stop and a flat face arranged opposite to the stop. The flat faces of the two stop devices are arranged either on a setting carrier in the camera housing or on the mirror carrier. The flat faces of the two stop devices extend in mutually parallel planes. The first and second stop devices are shiftable both in relation to one another for the adjustment of the oblique position of the viewfinder mirror and in common for the sharp focussing of the viewfinder image.

6 Claims, 4 Drawing Figures

MONOCULAR REFLEX CAMERA HAVING REFLEX MIRROR STOP ADJUSTMENT

BACKGROUND TO THE INVENTION

The invention relates to a monocular reflex camera having a device for adjusting the viewfinding position of a viewfinder mirror the pivot spindle of which, which is not fast in position, is arranged in crankshaft manner in the camera housing, where the viewfinder mirror is urged by a spring in the viewing position by first and second stop devices which are adjustable both in relation to one another for the setting of the oblique position of the viewfinder mirror and in common for the sharp focussing of the viewfinder image, in the camera housing.

STATEMENT OF PRIOR ART

For the adjustment of the viewfinder mirror in the viewing position arrangements are known (GFR P.S. No. 842,445, GFR Pub. Sp. No. 2,720,541) which comprise a first stop device for the setting of the oblique position, amounting to about 45°, of the viewfinder mirror and a second stop device for the sharp focussing of the shot. The pivot shaft of the viewfinder mirror, mounted in crankshaft manner, is movable by the second stop device in such a way that in the common shifting of the two stop devices for the purposes of sharp focussing of the shot in the viewfinder image plane no similar movement of the two stop devices takes place, but an additional pivoting of the viewfinder mirror takes place, and thus an unintentional falsification of the previously adjusted oblique position of the viewfinder mirror occurs.

OBJECT OF THE INVENTION

For the purpose of avoiding repeated adjustment operations the problem of the invention is a device for adjusting the sharp focus of the shot without falsification of the oblique position of the viewfinder mirror.

SUMMARY OF THE INVENTION

In accordance with the invention this is achieved in that each stop device consists of a stop and a flat face opposite to and associated with the stop, the flat faces of the two stop devices are arranged either on an adjusting carrier in the camera housing or on the mirror carrier, and the flat faces of both stop devices extend in planes parallel to one another. According to a preferred embodiment of the invention the flat faces lie in one common plane and this common plane can be formed by the back of the mirror carrier. For the shifting of the viewfinder mirror the flat faces of the two stop devices can be arranged inclined at equal setting angles in relation to the common direction of shift of the two stop devices. The pivot spindle of the viewfinder mirror is expediently formed as the stop of one of the two stop devices.

BRIEF DESCRIPTION OF DRAWINGS

The invention is explained by reference to illustrated and described examples of embodiment.

DESCRIPTION OF PREFERRED EMBODIMENT

Figure 1:
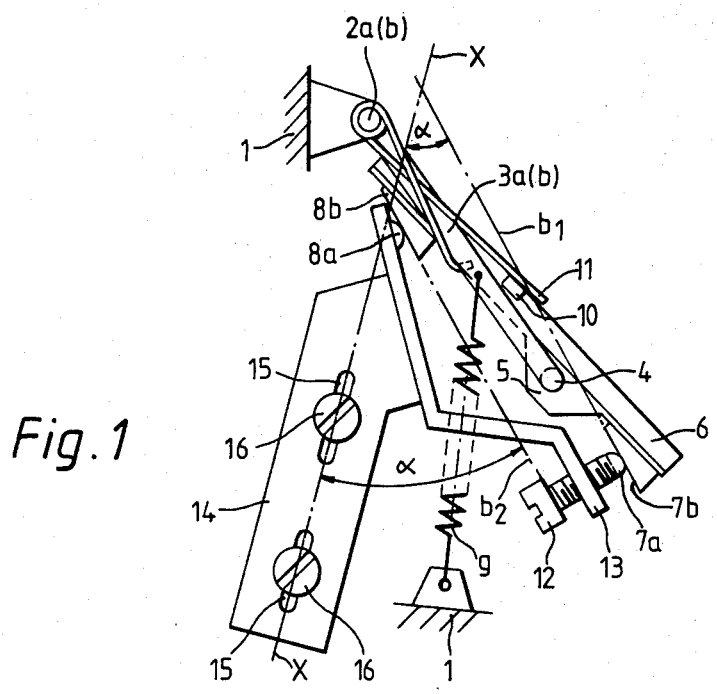
FIG. 1 shows a mirror arrangement with adjusting device according to the invention.
Figure 2:
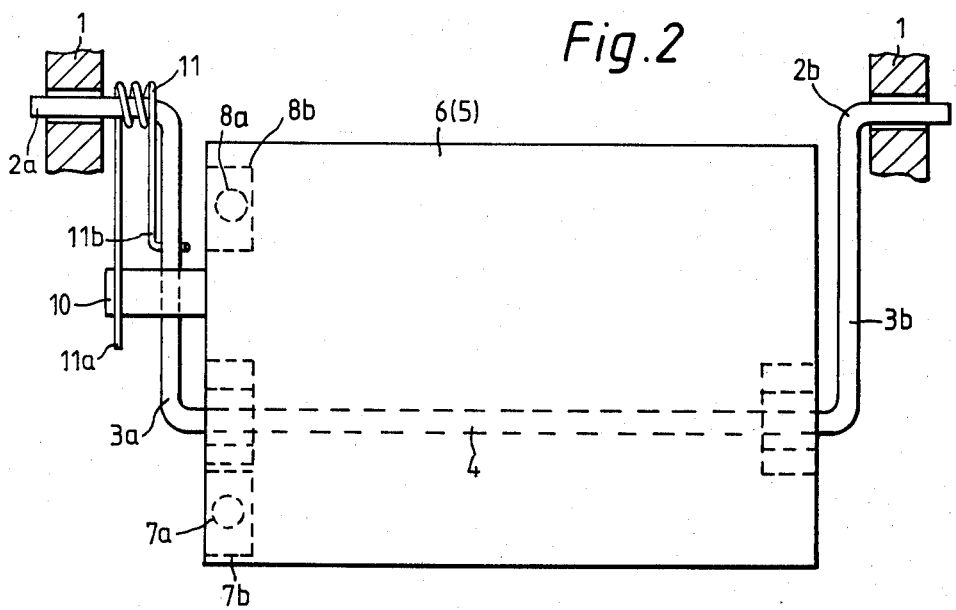
FIG. 2 shows the mirror mounting according to FIG. 1.

In a camera housing 1, which is illustrated only by way of indication, the pivot shaft 4, which is made integral with the bent-away crank arms 3 ($a$, $b$) and the journals 2 ($a$, $b$) (see FIG. 2), is mounted in crankshaft manner by means of the said journals 2 ($a$, $b$). The mirror carrier 5 carrying the viewfinder mirror 6 (see FIG. 1) is rotatably mounted on the pivot shaft 4. Between the journals 2 ($a$, $b$) and the pivot shaft 4 the stop lug 10 is provided on the mirror carrier 5 and protrudes over the crank arm 3$a$. A loop spring 11 is coiled round the journal 2$a$. The first arm 11$a$ of the loop spring 11 presses against the stop lug 10 and the second arm 11$b$ presses against the crank arm 3$a$ in order to keep the stop lug 10 in contact with the crank arm 3$a$. The return spring 9 hooked on the crank arm 3$a$ seeks to hold the viewfinder mirror 6 in the viewfinding position.

The viewfinding position for the viewfinder mirror 6 is determined by adjustable stop devices. The first stop device 7 serves for setting the pivot position of the viewfinder mirror 6 and consists of the stop 7$a$ and the flat face 7$b$. The flat face 7$b$ is arranged on the back of the mirror carrier 5. The stop 7$a$ is situated at the tip of a setting screw 12 which is screwed into the lug 13 of the setting plate 14. The second stop device 8 consists of the stop 8$a$ and the flat face 8$b$. The stop 8$a$ is arranged rigidly on the setting plate 14; the flat face 8$b$ is situated on the back of the mirror carrier 5. The two flat faces 7$b$ and 8$b$ extend in planes $b_1$ and $b_2$ respectively which are parallel to one another. The clamping screws 16 extend through the slots 15 of the setting plate 14.

The manner of operation of the arrangement is as follows:

The mirror carrier 5 is held with the viewfinder mirror 6 in the viewfinding position as illustrated by the return spring 9. The flat faces 7$b$ and 8$b$ here lie on the stops 7$a$ and 8$a$ respectively allocated to them. By rotation of the setting screw 12 firstly the stop 7$a$ is adjusted until the desired oblique position of the mirror carrier 5 with the viewfinder mirror 6 is reached. For the sharp focussing of the viewfinder image the setting plate 14 is moved, after slackening of the clamping screws 16, in its slots 15 in the adjusting direction X—X. In this movement the stops 7$a$ and 8$a$ slide along on the associated flat faces 7$b$ and 8$b$ respectively. Due to the parallel placing of the flat faces 7$b$ and 8$b$ in relation to one another here a parallel displacement of the mirror carrier 5 with the viewfinder mirror 6 takes place. As a result of the inclination of the planes $b_1$ and $b_2$ of the flat faces 7$b$ and 8$b$ in relation to the adjusting direction X—X of the setting plate 14 by the angle $\alpha$ a precise sharp focussing of the mirror carrier 5 with the viewfinder mirror 6 can take place because the shift paths of the setting plate 14 and of the mirror carrier 5 are in the relationship to one another as 1: $\sin \alpha$.

Figure 3:
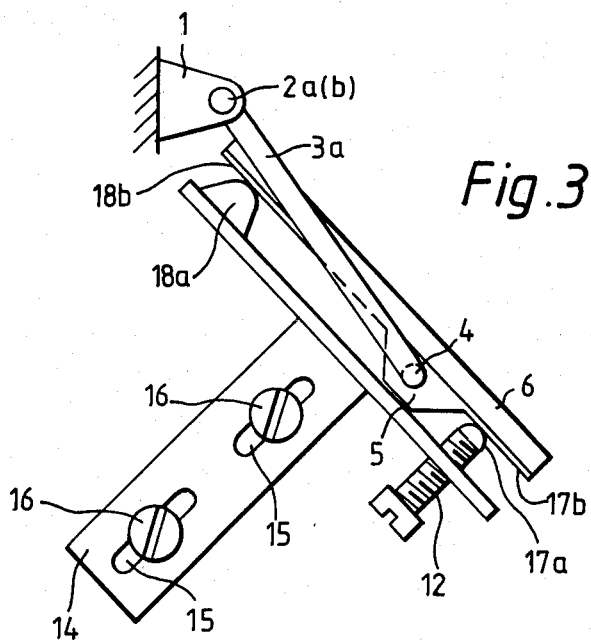
FIG. 3 shows another embodiment of the adjusting device and FIG. 4 shows a further variant of the adjusting device.

In a simplified embodiment (see FIG. 3) the flat faces 17$b$ and 18$b$ are formed directly by the back of the mirror carrier 5. The stop 17$a$ is arranged opposite to the flat face 17$b$ and the stop 18$a$ is arranged opposite to the flat face 18$b$, the stop 17$a$ being made adjustable in relation to the setting plate 14 and the stop 18$a$ being made rigid on the setting plate 14. The manner of operation is the same as in the embodiment according to FIG. 1 merely with the difference that the adjusting direction X—X of the setting plate 14 extends perpendicularly of the plane of the viewfinder mirror 6.

Figure 4:
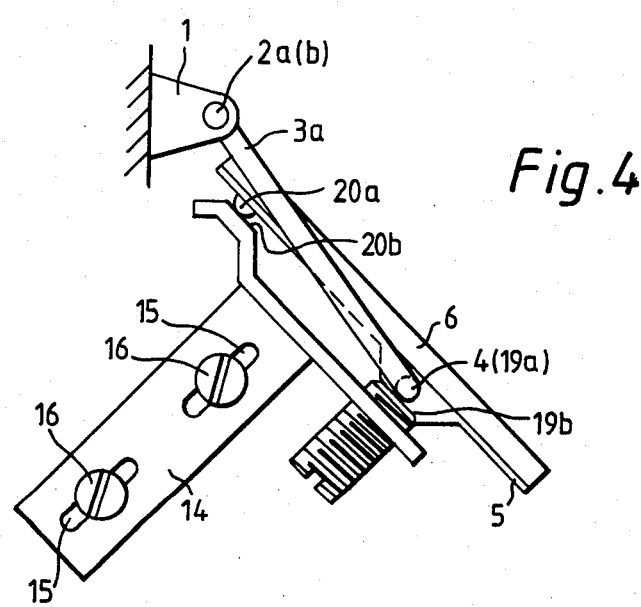

According to a further embodiment (see FIG. 4), the mutually parallel flat faces 19b and 20b are provided on the setting plate 14. The flat face 19b is formed as the plane end face of the screw 21 which is situated adjustably in the setting plate 14. The flat face 19b is arranged opposite to the pivot shaft 4, constituting the stop 19a, and with this shaft forms a first stop device 19. The further flat face 20a again lies parallel with the flat face 19b and is provided rigidly on the setting plate 14. The stop 20b on the back of the mirror carrier 5 is associated with this flat face 20b, whereby a second stop device 20 is formed. The manner of operation is substantially the same as in the example of embodiment according to FIG. 3; admittedly on movement of the setting plate 14 the stops 19a and 20a connected with the mirror carrier 5 slide in relation to the flat faces 19b and 20b provided on the setting plate 14.

The invention is not limited to the examples of embodiment as illustrated and described. Still further variants are conceivable. The essential point is always that the flat faces of the two stop devices lie in mutually parallel planes.

We claim:

1. A monocular reflex camera having a housing and a viewfinder mirror and carrier assembly arranged therein and movable between a viewing position and an exposure taking position, comprising:
    (a) a pivoted crank arm of which the pivot shaft is connected with the mirror and carrier assembly,
    (b) a setting carrier adjustably mounted within said camera housing,
    (c) first and second stop devices which are shiftable both in relation to one another for the adjustment of the oblique viewfinding position of the viewfinder mirror,
    (d) spring means for urging said assembly into the viewfinding position,
    (e) each stop device consisting of a stop and a flat face arranged opposite to the stop, both the stops being arranged on one of the setting carrier and mirror carrier and both the flat faces of the two stop devices being arranged on the other of the setting carrier and the mirror carrier, the flat faces of the two stop devices extending in mutually parallel planes.
    whereby the first and second stop devices are adjustable in relation to each other for the purpose of adjusting the angle of the reflex mirror and adjustable together for the purpose of sharp focussing of the viewfinder image.

2. A camera according to claim 1, wherein said stop devices are mounted on said setting carrier and said flat faces are formed on the mirror and carrier assembly.

3. A camera according to claim 1 wherein the flat faces lie in one common plane.

4. A camera according to claim 3, wherein the flat faces are formed directly by the back of the mirror carrier.

5. A camera according to claim 1, wherein the flat faces of the two stop devices are arranged inclined at an acute setting angle in relation to the shifting direction of the two stop devices.

6. A camera according to claim 1, wherein the pivot spindle of the viewfinder mirror is formed as stop.

* * * * *